US012155671B2

(12) United States Patent
Farhady Ghalaty et al.

(10) Patent No.: US 12,155,671 B2
(45) Date of Patent: *Nov. 26, 2024

(54) METHODS AND SYSTEMS FOR PROVISIONING CLOUD COMPUTING SERVICES

(71) Applicant: Capital One Services, LLC, McLean, VA (US)

(72) Inventors: Nahid Farhady Ghalaty, Fairfax, VA (US); Vincent Pham, Seattle, WA (US); Geeta Shyamala, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,006

(22) Filed: Oct. 19, 2023

(65) Prior Publication Data

US 2024/0073218 A1 Feb. 29, 2024

Related U.S. Application Data

(63) Continuation of application No. 17/815,829, filed on Jul. 28, 2022, now Pat. No. 11,831,653, which is a continuation of application No. 16/880,969, filed on May 21, 2020, now Pat. No. 11,425,145, which is a continuation of application No. 16/701,367, filed on Dec. 3, 2019, now Pat. No. 10,686,802.

(51) Int. Cl.
*H04L 47/83* (2022.01)
*H04L 9/40* (2022.01)
*H04L 67/10* (2022.01)

(52) U.S. Cl.
CPC ............ *H04L 63/108* (2013.01); *H04L 47/83* (2022.05); *H04L 67/10* (2013.01)

(58) Field of Classification Search
CPC ....... H04L 63/108; H04L 47/83; H04L 67/10; H04L 43/0876; H04L 63/10; H04L 63/08; H04L 47/70
See application file for complete search history.

(56) References Cited

U.S. PATENT DOCUMENTS

| | | | |
|---|---|---|---|
| 9,742,684 B1* | 8/2017 | Krotkov | H04L 47/70 |
| 2010/0217865 A1* | 8/2010 | Ferris | H04L 47/83 |
| | | | 709/226 |
| 2014/0282352 A1* | 9/2014 | Alonzo | G06Q 10/06 |
| | | | 717/101 |
| 2016/0323158 A1* | 11/2016 | Hu | H04L 43/0876 |
| 2016/0338072 A1* | 11/2016 | Cohen | H04L 67/10 |
| 2016/0350198 A1* | 12/2016 | Neuvirth-Telem | G06F 11/006 |
| 2019/0297028 A1* | 9/2019 | Zhao | H04L 47/821 |

* cited by examiner

*Primary Examiner* — Ali S Abyaneh
(74) *Attorney, Agent, or Firm* — Foley & Lardner LLP

(57) ABSTRACT

Methods and systems are disclosed for improvements in cloud services by sharing estimated and actual usage data of cloud services recipients with the cloud services provider. The sharing of this data allows the cloud services provider to better apportion cloud resources between multiple cloud services recipients. By analyzing information included in the shared data (e.g., information about one or more applications that use the cloud resources), the cloud services provider may categorize the applications and/or the functions of those applications into authorized and unauthorized uses, the determination of which, is used to further efficiently apportion the cloud services resources.

20 Claims, 5 Drawing Sheets

METHODS AND SYSTEMS FOR PROVISIONING CLOUD COMPUTING SERVICES

CROSS-REFERENCE TO RELATED APPLICATIONS

This application is a continuation of U.S. patent application Ser. No. 17/815,829 filed Jul. 28, 2022, which is a continuation of U.S. patent application Ser. No. 16/880,969, filed May 21, 2020, which is a continuation of U.S. patent application Ser. No. 16/701,367, filed Dec. 3, 2019. The content of the foregoing applications is incorporated herein in its entirety by reference.

FIELD OF THE INVENTION

The invention relates to provisioning cloud computing services.

BACKGROUND OF THE INVENTION

In recent years, many companies have moved away from using their own dedicated hardware in many computing areas. Instead, these companies are shifting towards cloud computing resources, which are on-demand computer system resources, especially those that cater to data storage and computing power, and for which the companies do not have direct and/or active management over. In many cases the physical hosts of these cloud computing resources are physically hosted at data centers located in geographically dispersed locations and are available to the companies via the Internet.

SUMMARY OF THE INVENTION

Methods and systems are disclosed herein for improvements in cloud services. While cloud services have exponentially increased the amount of computing resources available to companies, the needs of those companies for cloud services has also increased. Thus, in many cases, the cloud services provider is continually searching for more efficient techniques for managing cloud computing resources. One such technique includes the sharing of estimated and actual usage data of cloud services recipients and the cloud services provider. The sharing of this data, which would not occur in conventional systems, allows the cloud services provider to better apportion cloud resources between multiple cloud services recipients, as discussed below. Moreover, by analyzing information included in the shared data (e.g., information about one or more applications that use the cloud resources), the cloud services provider may categorize the applications and/or the functions of those applications into authorized and unauthorized uses, the determination of which will be used to further efficiently apportion the cloud services resources.

In one aspect, methods and systems are provided for provision cloud services. A cloud services provider (e.g., a server of the cloud services provider) may receive a first usage file from a first cloud services recipient. The first usage file from the first cloud services recipient may include an estimated amount of cloud resources to be used by the first cloud services recipient during a first time period. For example, the cloud services provider may receive information on the amount of and/or type of cloud resources a given recipient believes it will consume during a given day, week, month, etc. By receiving this information, the cloud services provider may better predict upcoming usage in order to more efficiently apportion resources.

The cloud services provider may then receive an output file from the second cloud services recipient. The output file from the second cloud services recipient includes an actual amount of cloud resources used by the second cloud services recipient during the first time period. For example, the server may receive information on the actual amount of and/or type of cloud resources a given recipient consumes during a day, week, month, etc. In some embodiments, the output file may include information that the cloud services provider could not obtain by monitoring the usage of the cloud resources. For example, the output file may include information on the individual applications, functions, etc. that consumed the cloud resources. Such information may include the lengths of code of one or more applications that used cloud resources during the first time period, a number of function calls of one or more applications that used cloud resources during the first time period, data on end-users for which the one or more applications and/or function calls services, etc. By receiving this information, the cloud services provider may better understand the usage and/or type of usage in order to more efficiently apportion resources. It should be noted that in some embodiments, the output file and the information contained within that output file may provide one or more datasets for training and/or testing a machine learning algorithm. Notably, as described below, the cloud services provider may train a machine learning algorithm to detect the correlation between the information of the output file and a particular use of the cloud resources. For example, while conventional systems are not able to use the aforementioned information to detect a correlation, the advent of machine learning embodiments, particularly embodiments disclosed herein that allow the cloud services to allocate more memory to the machine learning application as a parameter, allow for smaller random sampling, allow applications themselves to be run on cloud resources with larger memory and storage capacities, and/or use progressive loading in order to account for the large, dynamic, and/or varied datasets encountered in the uses described herein.

The cloud services provider may then determine a ratio of the estimated amount of cloud resources to be used by the first cloud services recipient during the first time period to the actual amount of cloud resources used by the first cloud services recipient during the first time period. By receiving determining this information, the cloud services provider may refine future estimates of the cloud resources needed by the given recipient. For example, the cloud services provider may detect particular times and/or circumstances when the cloud services recipient (and/or all cloud services recipients) estimates are more or less precise and/or have a higher degree of accuracy as well as authorized and unauthorized application types, functions etc. that may affect the precision and/or accuracy of the estimated amount of cloud resources being used. It should be noted that in some embodiments, the development of the aforementioned ratio (or other quantitative or qualitative metric describing the relationship of one value to another) is an on-going dynamic process that factors in multiple time periods of data and/or the usage and/or output files for those time periods.

The cloud services provider may then receive a second usage file from the first cloud services recipient. The second usage file from the first cloud services recipient may include an estimated amount of cloud resources to be used by the first cloud services recipient during a second time period. For example, the cloud services provider may receive information on the amount of and/or type of cloud resources the given recipient believes it will consume during another day, week, month, etc. By receiving this information, the cloud services provider may once again better predict upcoming usage in order to more efficiently apportion resources.

The cloud services provider may determine a predicted amount of cloud resources needed by the first cloud services recipient during the second time period by applying the ratio to the estimated amount of cloud resources to be used by the first cloud services recipient during the second time period. For example, as opposed to relying simply on the estimation of the cloud services recipient in the given time period, the cloud services provider may determine a predicted amount that is based on the previously determined ratio. By using this ratio to predict the actual use of the cloud services recipient in the second time period, the cloud services provider can apply the information received that indicates particular applications, time periods and/or circumstances when the cloud services recipient (and/or all cloud services recipients) estimates are more or less precise and/or have a higher degree of accuracy.

The cloud services provider may then apportion an amount of cloud resources to the first cloud services recipient for the second time period based on the predicted amount of cloud resources needed by the first cloud services recipient during the second time period. For example, by basing the apportionment of the cloud services off of the predicted amount, as opposed to simply the estimate of the cloud services recipient, the cloud services provider may predict a more precise and/or accurate level of use as well as discount use attributed to unauthorized application types, functions, etc.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
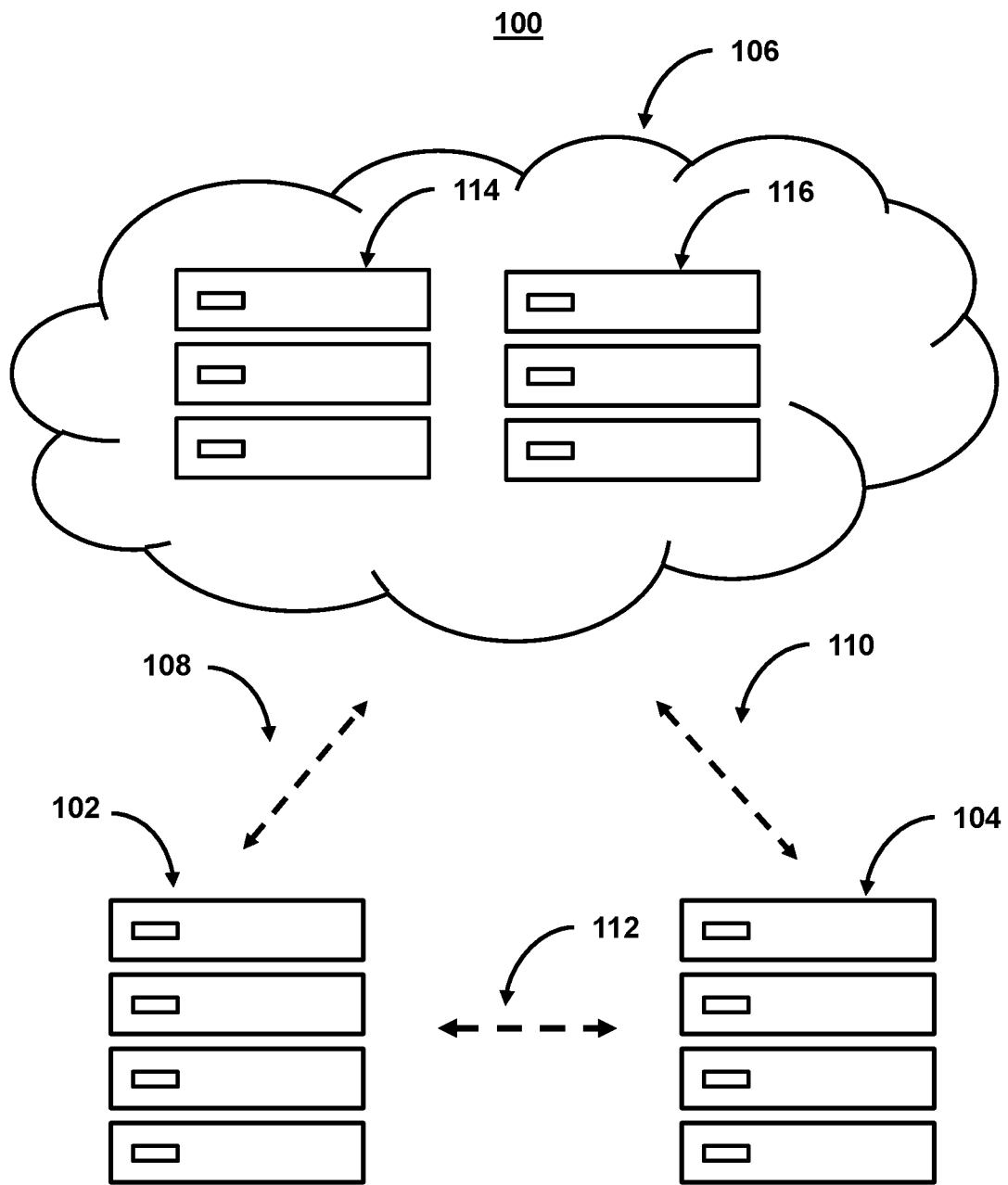
FIG. 1 show systems for provisioning cloud services, in accordance with one or more embodiments.

FIG. 1 shows a system 100 for provisioning cloud services, in accordance with one or more embodiments. As shown in FIG. 1, system 100 may include client device 102, client device 104 (or client devices 104a-104n), or other components. Each of client devices 102 and 104 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 102 and 104 may include a desktop computer, a notebook computer, a tablet computer, a smartphone, a wearable device, or other client device. Users may, for instance, utilize one or more client devices 102 and 104 to interact with one another, one or more servers, or other components of system 100. It should be noted that, while one or more operations are described herein as being performed by particular components of client devices 102 or 104, those operations may, in some embodiments, be performed by other components of client devices 102 or 104 or other components of system 100. As an example, while one or more operations are described herein as being performed by components of client device 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks.

Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In FIG. 1, client device 102 may represent the client device of a first cloud services recipient. For example, the cloud service may be made available to multiple client devices (e.g., end users) on demand via the Internet (e.g., path 108 or 110) from a cloud services provider's servers (e.g., server 114 and server 116) as opposed to end users using servers at the end user's location and/or owned by the end user. It should be noted that cloud service 106 includes servers 114 and server 116; however, cloud service 106 may include additional components. In some embodiments, server 114 and server 116 may represent edge servers that are geographically close to a represent client device. In such embodiments, edge server 114 and edge server 116 may be further connected to a central server in cloud service 106. The central server may assign and select server 114 and/or server 116 to a given client device, application, and/or end user based on the geographic location of the client device with respect to the edge server, based on the network conditions along a given network path, and/or other quality of service conditions on the network.

Cloud service 106 may be structured according to one or more service-oriented architecture models. For example, cloud service 106 may be designed to provide easy, scalable access to applications, resources and services, and are designed to fully managed cloud services provider. In particular, cloud service 106 may dynamically scale to meet the needs of client device 102 and client device 104. In some embodiments, the cloud service 106 may supply some or all cloud resources (e.g., hardware and software necessary for all or some of the operation of one or more cloud services) to cloud services recipient. The cloud services provider may provide cloud services such as online data storage and backup solutions, Web-based e-mail services, hosted office suites and document collaboration services, database processing, managed technical support services, and/or general computer power and data processing. In some embodiments, the cloud resource may be a network, server, storage device, application and/or service. Notably, cloud service models may use a multitude of different formats each with their own benefits and weaknesses to both the cloud services provider and the cloud services recipient. In most models, these benefits and weaknesses are balanced based on the needs and/or business goals of the cloud services provider and the cloud services recipient. However, through the 0 sharing of estimated and actual usage data of cloud services recipients and the cloud services provider, including the information on application usage in that data, the cloud services provider and the cloud services recipient may better balance these weaknesses and benefits. In particular, this balance allows the cloud services provider and the cloud services recipient to switch from one model to another and/or deviate from traditional model formats. These deviations can be accomplished through the apportionment methods described below. For example, by analyzing information included in the shared data (e.g., information about one or more applications that use the cloud resources), the cloud services provider may categorize the applications and/or the functions of those applications into authorized and unauthorized uses, the determination of which, is used to further efficiently apportion the cloud services resources.

For example, cloud service 106 may be structured according to an infrastructure as a service ("IaaS") model in which online services that provide high-level APIs used to dereference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines and the ability to scale services up and down according to the end users varying requirements. In such embodiments, where the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

Cloud service 106 may also be structured as a platform as a service ("PaaS") model. In such embodiments, cloud service 106 deploys onto the cloud infrastructure consumer-created or acquired applications created using programming languages, libraries, services, and tools supported by the cloud services provider. The end user does not manage or control the underlying cloud infrastructure including network, servers, operating systems, or storage, but has control over the deployed applications and possibly configuration settings for the application-hosting environment. In this model, the end users do not manage or control the underlying cloud infrastructure including network, servers, operating systems, or storage, but have control over the deployed applications and possibly configuration settings for the application-hosting environment, and the end user has access to execution runtime code, databases, web servers, development tools, etc.

Cloud service 106 may also be structured as a software as a service ("SaaS") model. In such embodiments, cloud service 106 allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure including network, servers, operating systems, storage, or even individual application capabilities, with the possible exception of limited user-specific application configuration settings.

Depending on the model or models used by the cloud services provider the manner in which cloud services are apportioned may change. For example, in a PaaS model in order to apportion the cloud service resources the cloud service 106 may install one or more applications of the first cloud services recipient on hardware of a cloud services provider. In another example, in a SaaS model in order to apportion the cloud service resources, cloud service 106 may set one or more limits for input/output operations per second for one or more applications of the first cloud services recipient.

It should be noted that in some embodiments, the cloud service may apportion cloud service resources according to those accustomed with other models. For example, as stated below, cloud service 106 may receive output files include specific information that allows cloud service 106 to better predict actual usage of a cloud services recipient as well as authorized use. Because cloud service 106 is better able to predict actual and/or authorized use, cloud service 106 may apportion cloud services using techniques not accustomed to that model. For example, in a SaaS model, cloud service 106 may install one or more applications of the first cloud services recipient on hardware of a cloud services provider. In another example, in a PaaS model in order to apportion the cloud service resources, cloud service 106 may set one or more limits for input/output operations per second for one or more applications of the first cloud services recipient.

In some embodiments, cloud service 106 may use one or more prediction models to predict an actual and/or authorized use of cloud resources. The prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
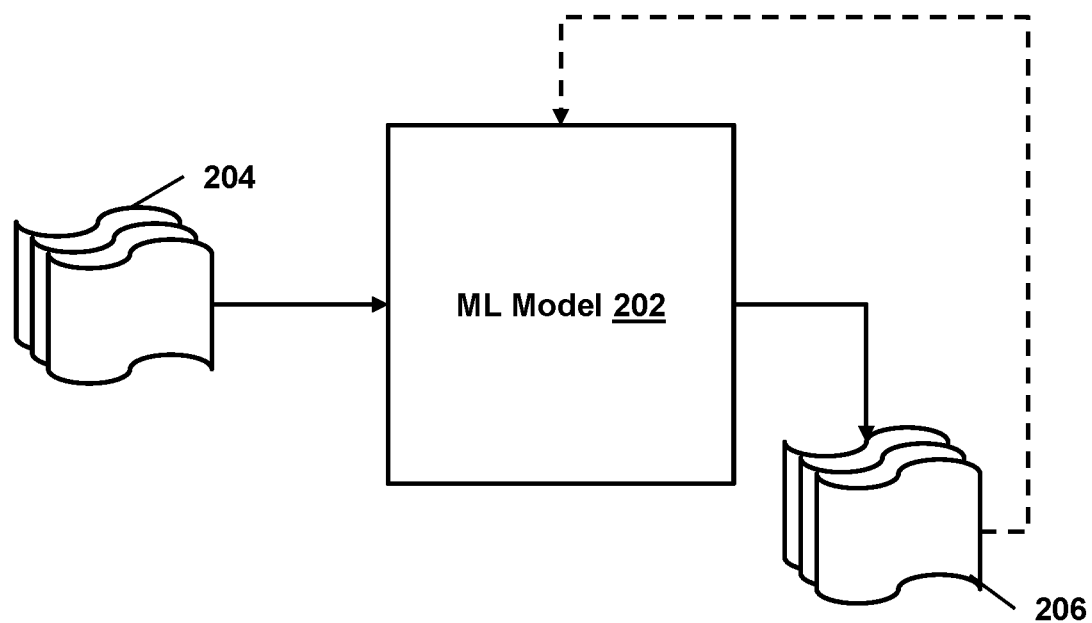
FIG. 2 shows a machine learning model configured to provision cloud services, in accordance with one or more embodiments.

As an example, with respect to FIG. 2, machine learning model 202 may take inputs 204 and provide outputs 206. For example, inputs may include information received from output files such as an actual amount of cloud resources used by a first cloud services recipient during a first time period and first time period application information. The first time period application information may include information about one or more applications that used cloud resources during the first time period. This information may further include specific information that may be accessible, but not modifiable by cloud service 106. For example, the information may include lengths of code of one or more applications that used cloud resources and/or a number of function calls of one or more applications that used cloud resources. This information may be compared to similar information from different time periods to determine peculiarities in the applications.

For example, cloud services recipients may in some instances use cloud resources in an unauthorized manner. This unauthorized manner may include a use that is illegal and/or against the terms of use of the cloud service. For example, a first cloud services recipient may artificially increase its use of cloud resources (e.g., by artificially increasing the length of code of its application and/or the number of function calls) in order to prevent other cloud services recipients from using the cloud resources and/or to lower the performance of the cloud resources.

The first cloud services recipient may therefore provide itself a competitive advantage by decreasing its competitor's cloud services performance. By monitoring this information, cloud service 106 may detect these unauthorized uses. In another example, the terms of service of the cloud services provider may prevent the use of cloud resources for commercial use, training machine learning algorithms, mining cryptocurrencies, and/or other resource intense operations. By monitoring the length of code and/or function calls, cloud service 106 may determine when these unauthorized uses are occurring. For example, the cloud services provider may monitor the average length of code of an application performing a given function from one time period to another to detect discrepancies. Likewise, the cloud services provider may monitor the average number of function calls of an application performing a given function from one time period to another to detect discrepancies. If the length of code and/or function calls increases/decreases at given time period, which has correlations to higher performance of a second cloud services recipient, the cloud services provider may detect the unauthorized use. Slight deviations as well as compensating for the actual uses of the first cloud services recipient may in some embodiments, necessitate large data sets that may be interpreted by the machine learning model.

In another example, inputs may also include estimated and actual usage data as provided by cloud services recipients during various time periods. This information may be compared to similar information from different time periods to predict periods of high or lower use and/or the need for more cloud service resources as well as the particular cloud services recipients and/or types of cloud services recipients that may experience the high or low period of use. Additionally, cloud service 106 may determine particular cloud services recipient that have similar patterns of use. For example, if cloud service 106 determines that client device 102 and client device 104 are associated with cloud services recipients that both have a high amount of use during a given time period (e.g., a weekend), cloud service 106 may select different physical hosts and/or physical hosts located along different network routes in order to minimize resource strain. For example, in response to this determination, cloud service 106 may select a first cloud services physical host (e.g., server 114) for the first cloud services recipient (e.g., client device 102) for a time period and a second cloud services physical host (e.g., server 116) for the second cloud services recipient (e.g., client device 104) for the time period based on the amount of cloud resources apportioned to the first cloud services recipient for the time period and on the amount of cloud resources apportioned to the second cloud services recipient for the time period (e.g., based on the predicted actual and/or authorized use of each cloud services recipient).

In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Figure 3:
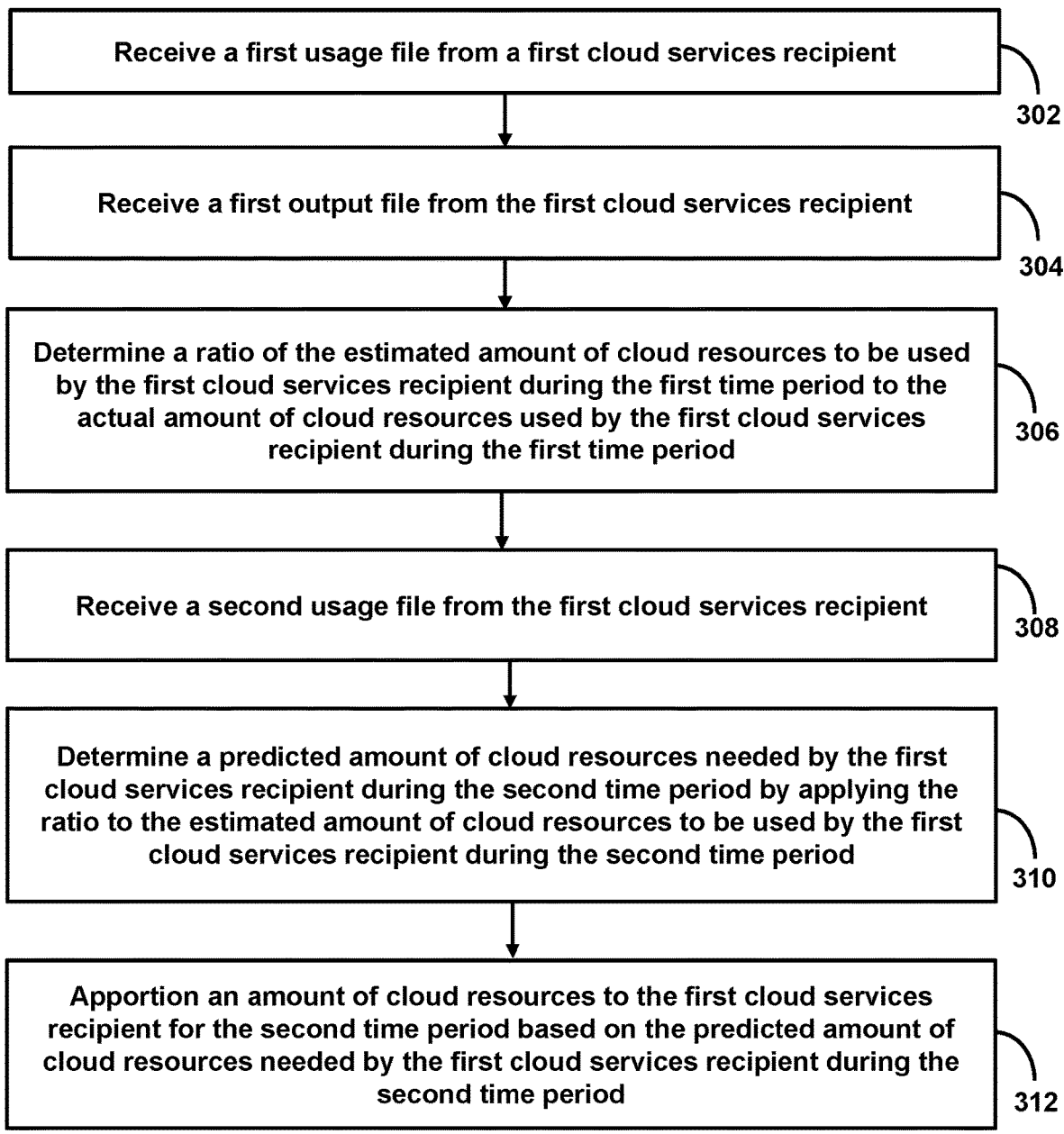
FIG. 3 shows a flowchart of a process for apportioning cloud resources, in accordance with one or more embodiments.

FIG. 3 shows a flowchart of a process for apportioning cloud resources, in accordance with one or more embodiments. For example, process 300 may represent the steps taken by one or more devices as shown in FIGS. 1-2 apportioning cloud resources.

At step 302, process 300 (e.g., via control circuitry at server 114 (FIG. 1)) receive a first usage file from a first cloud services recipient, wherein the first usage file from the first cloud services recipient includes an estimated amount of cloud resources to be used by the first cloud services recipient during a first time period. For example, server 114 (FIG. 1) may receive a first usage file from a first cloud services recipient (client device 102 (FIG. 1)), in which the first usage file includes a first estimated amount of a cloud resource to be used by the first cloud services recipient during a first time period (e.g., a given hour, day, week, etc.).

At step 304, process 300 (e.g., via control circuitry at server 114 (FIG. 1)) receives a first output file from the first cloud services recipient, wherein the first output file from the first cloud services recipient includes an actual amount of cloud resources used by the first cloud services recipient during the first time period. For example, server 114 (FIG. 1) may receive a first output file from the first cloud services recipient (client device 102 (FIG. 1)), wherein the first output file from the first cloud services recipient includes an actual amount of cloud resources used by the first cloud services recipient during the first time period.

At step 306, process 300 (e.g., via control circuitry at server 114 (FIG. 1)) determines a ratio of the estimated amount of cloud resources to be used by the first cloud services recipient during the first time period to the actual amount of cloud resources used by the first cloud services recipient during the first time period. For example, server 114 (FIG. 1) may determine a first ratio of the estimated amount of cloud resources to be used by the first cloud services recipient (client device 102 (FIG. 1)) to the actual amount of cloud resources used by the first cloud services recipient during the first time period. It should be noted that cloud service 114 may determine any quantitative or qualitative relation between the estimated amount of cloud resources to be used by the first cloud services recipient during the first time period to the actual amount of cloud resources used by the first cloud services recipient during the first time period, and not necessarily a mathematical ratio. For example, cloud service 114 may use a percentage, factor, or some other numerical estimate of a confidence level in the estimated amount of cloud resources requested by the cloud services recipient. It should be further noted that the ratio (or other metric of quantitative or qualitative relation may be based on information from multiple cloud services recipients, files, and/or time periods. It should also be noted that the metric may be continually and dynamically updated (e.g., as more information is received).

At step 308, process 300 (e.g., via control circuitry at server 114 (FIG. 1)) receives a second usage file from the first cloud services recipient, wherein the second usage file from the first cloud services recipient includes an estimated amount of cloud resources to be used by the first cloud services recipient during a second time period. For example, server 114 (FIG. 1) may receive a second usage file from the first cloud services recipient (client device 102 (FIG. 1)), wherein the second usage file includes an estimated amount of a cloud resource to be used by the first cloud services recipient during a second time period.

At step 310, process 300 (e.g., via control circuitry at server 114 (FIG. 1)) determines a predicted amount of cloud resources needed by the first cloud services recipient during the second time period by applying the ratio to the estimated amount of cloud resources to be used by the first cloud services recipient during the second time period. For example, server 114 (FIG. 1) may estimate an amount of the cloud resource used by the first cloud services recipient (client device 102 (FIG. 1)) during the second time period by applying the first ratio to the estimated amount of a cloud resource to be used by the first cloud services recipient during the second time period.

At step 312, process 300 (e.g., via control circuitry at server 114 (FIG. 1)) apportions an amount of cloud resources to the first cloud services recipient for the second time period based on the predicted amount of cloud resources needed by the first cloud services recipient during the second time period. For example, server 114 (FIG. 1) may apportion an amount of the cloud resource to the first cloud services recipient (client device 102 (FIG. 1)) during the second time period based on the estimated amount of the cloud resource used by the first cloud services recipient during the second time period. In some embodiments, server 114 (FIG. 1) may apportion an amount of cloud resources to a second cloud services recipient for the second time period based on the amount of cloud resources apportioned to the first cloud services recipient for the second time period. In such cases, the amount of cloud resources apportioned to the second cloud services recipient for the second time period may be further based on an estimated amount received in a usage file from the second cloud services recipient.

Additionally or alternatively, server 114 (FIG. 1) may apportion the amount of cloud resources to the first cloud services recipient during the second time period by installing one or more applications of the first cloud services recipient on hardware of a cloud services provider and/or setting one or more limits for input/output operations per second for one or more applications of the first cloud services recipient. For example, server 114 (FIG. 1) may directly run an individual application of the first cloud services recipient on hardware of the cloud services provider.

In some embodiments, the first output file from the first cloud services recipient may further include first time period application information which includes information about one or more applications that used cloud resources during the first time period. In such cases, process 300 (e.g., via control circuitry at server 114 (FIG. 1)) may receive a second output file from the first cloud services recipient, the second output file including second time period application information which includes information about one or more applications that used cloud resources during the second time period. Process 300 (e.g., via control circuitry at server 114 (FIG. 1)) may then determine whether an application used by the first cloud services recipient is of an unauthorized type based on comparing first time period application information with second time period application information (e.g., as discussed below in relation to FIG. 4).

In some embodiments, server 114 (FIG. 1) may select a first cloud services physical host for the first cloud services recipient for the second time period and a second cloud services physical host for the second cloud services recipient for the second time period based on the amount of cloud resources apportioned to the first cloud services recipient for the second time period and on the amount of cloud resources apportioned to the second cloud services recipient for the second time period.

In some embodiments, server 114 (FIG. 1) may continually and dynamically update the ratio used to predict the actual amount of resources needed based on other cloud services recipients (e.g., using client device 104 (FIG. 1)). For example, server 114 (FIG. 1) may receive a first usage file from a second cloud services recipient, wherein the first usage file from the second cloud services recipient includes an estimated amount of cloud resources to be used by the second cloud services recipient during the first time period. Server 114 (FIG. 1) may receive an output file from the second cloud services recipient, wherein the output file from the second cloud services recipient includes an actual amount of cloud resources used by the second cloud services recipient during the first time period. Server 114 (FIG. 1) may determine a second recipient ratio of the estimated amount of cloud resources to be used by the second cloud services recipient during the first time period to the actual amount of cloud resources used by the second cloud services recipient during the first time period. Server 114 (FIG. 1) may receive a second usage file from the second cloud services recipient, wherein the second usage file from the second cloud services recipient includes an estimated amount of cloud resources to be used by the second cloud services recipient during the second time period. Server 114 (FIG. 1) may determine a predicted amount of cloud resources needed by the second cloud services recipient during the second time period by applying the second recipient ratio to the estimated amount of cloud resources to be used by the second cloud services recipient during the second time period. Server 114 (FIG. 1) may apportion an amount of cloud resources to the second cloud services recipient for the second time period based on the predicted amount of cloud resources needed by the second cloud services recipient during the second time period.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 3.

Figure 4:
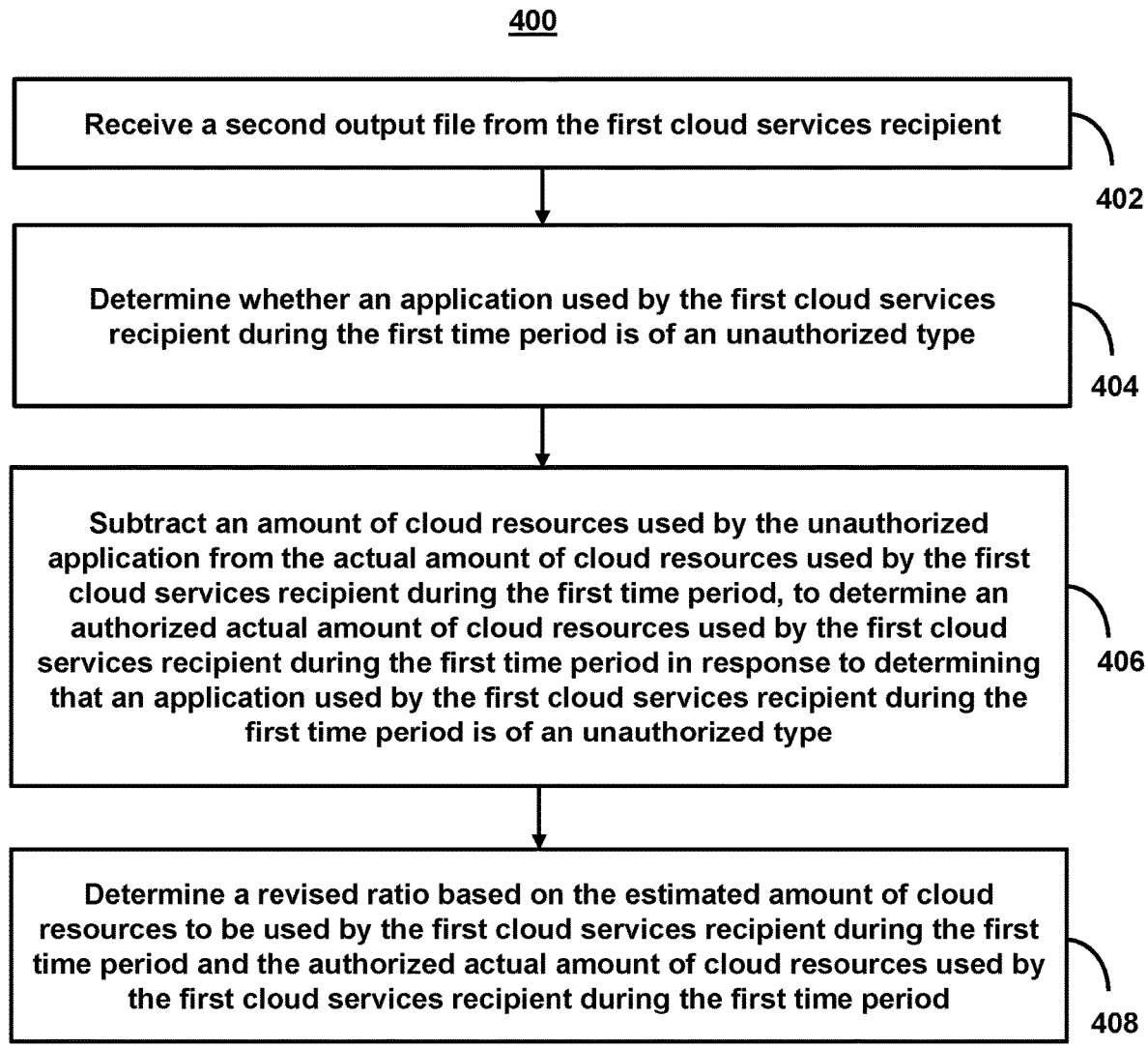
FIG. 4 shows a flowchart of a process for revising a ratio used to predict authorized uses of cloud resources, in accordance with one or more embodiments.

FIG. 4 shows a flowchart of a process for revising a ratio used to predict authorized uses of cloud resources, in accordance with one or more embodiments. For example, process 400 may represent the steps taken by one or more devices as shown in FIGS. 1-2.

At step 402, process 400 (e.g., via control circuitry at server 114 (FIG. 1)) may receive a second output file from a first cloud services recipient (client device 102 (FIG. 1)). For example, the second output file may include read only access to resource data of the first cloud services recipient. The resource data may indicate an actual amount of the cloud resource used by the first cloud services recipient during the second time period, and the second output file may further indicate the actual amount of the cloud resource used by individual applications of the first cloud services recipient during the second time period.

At step 404, process 400 (e.g., via control circuitry at server 114 (FIG. 1)) may determine whether an application used by the first cloud services recipient during the first time period is of an unauthorized type. For example, server 114 (FIG. 1) may determine an application type of the individual applications of the first cloud services recipient (client device 102 (FIG. 1)) during the first time period based on comparing the resource data of the first output file with the resource data of the second output file.

At step 406, process 400 (e.g., via control circuitry at server 114 (FIG. 1)) may subtract an amount of cloud resources used by the unauthorized application from the actual amount of cloud resources used by the first cloud services recipient during the first time period to determine an authorized actual amount of cloud resources used by the first cloud services recipient during the first time period in response to determining that an application used by the first cloud services recipient during the first time period is of an unauthorized type. For example, server 114 (FIG. 1) may subtract an actual amount of the cloud resource used by the unauthorized application of the first cloud services recipient (client device 102 (FIG. 1)) during the first time period from the actual amount of the cloud resource used by individual applications of the first cloud services recipient during the first time period to determine an authorized actual amount of the cloud resource used by the first cloud services recipient during the first time period in response to determining that the application type is an unauthorized application type.

At step 408, process 400 (e.g., via control circuitry at server 114 (FIG. 1)) may determine a revised ratio based on the estimated amount of cloud resources to be used by the first cloud services recipient during the first time period and the authorized actual amount of cloud resources used by the first cloud services recipient during the first time period. For example, server 114 (FIG. 1) may determine a revised ratio of the estimated amount of cloud resources to be used by the first cloud services recipient (client device 102 (FIG. 1)) to the authorized actual amount of cloud resources used by the first cloud services recipient during the first time period.

In some embodiments, server 114 (FIG. 1) may receive a second output file from the first cloud services recipient, wherein the second output file includes an actual amount of cloud resources used by the first cloud services recipient during the second time period, and wherein determining the revised ratio is further based on the estimated amount of cloud resources to be used by the first cloud services recipient during the second time period and the actual amount of cloud resources used by the first cloud services recipient during the second time period. In some embodiments, server 114 (FIG. 1) may determine the revised ratio based further on the estimated amount of cloud resources to be used by the first cloud services recipient during the second time period and an authorized actual amount of cloud resources used by the first cloud services recipient during the second time period.

Alternatively or additionally, server 114 (FIG. 1) may receive the second output file from the first cloud services recipient, wherein the second output file includes an actual amount of cloud resources used by the first cloud services recipient during the second time period. Server 114 (FIG. 1) determine whether an application used by the first cloud services recipient during the second time period is of an unauthorized type. In response to determining that an application used by the first cloud services recipient during the second time period is of an unauthorized type, server 114 (FIG. 1) may subtract an amount of cloud resources used by the unauthorized application from the actual amount of cloud resources used by the first cloud services recipient during the second time period, to determine an authorized actual amount of cloud resources used by the first cloud services recipient during the second time period. Server 114 (FIG. 1) may then determine a revised ratio based on the estimated amount of cloud resources to be used by the first cloud services recipient during the second time period and the authorized actual amount of cloud resources used by the first cloud services recipient during the second time period.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 4.

Figure 5:
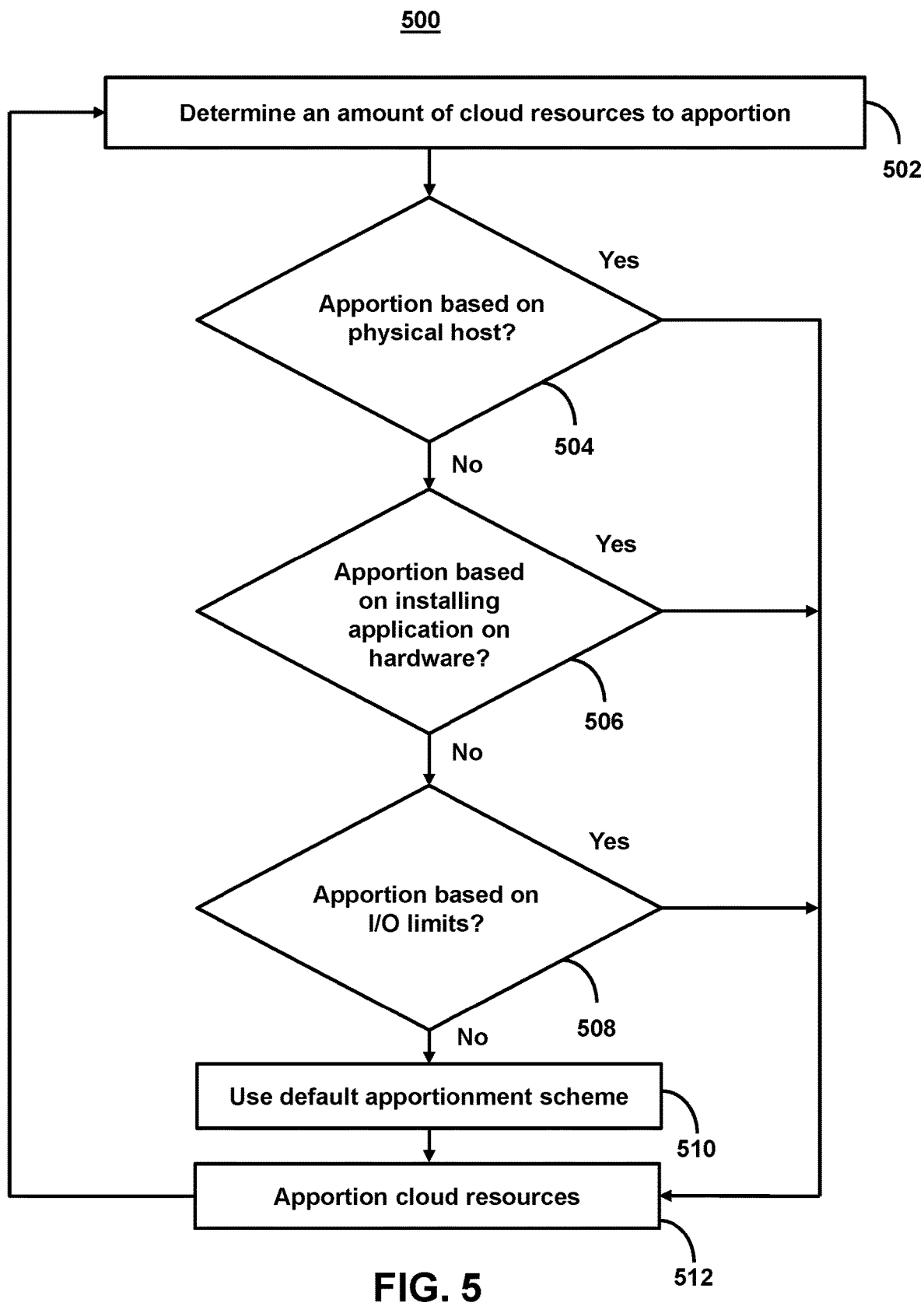
FIG. 5 shows a flowchart of a process for determining how to apportion cloud resources, in accordance with one or more embodiments.

FIG. 5 shows a flowchart of a process for determining how to apportion cloud resources, in accordance with one or more embodiments. For example, process 500 may represent the steps taken by one or more devices as shown in FIGS. 1-2.

At step 502, process 500 (e.g., via control circuitry at server 114 (FIG. 1)) determines an amount of cloud resources to apportion. For example, as described in step 310 (FIG. 3), server 114 may predict the amount of cloud resources needed by the first cloud services recipient during the second time period by applying the ratio to the estimated amount of cloud resources to be used by the first cloud services recipient during the second time period and apportion this amount.

At step 504, process 500 (e.g., via control circuitry at server 114 (FIG. 1)) determines whether to apportion based on a physical host. For example, cloud services provider may service multiple cloud services recipient (e.g., using client device 102 and 104 (FIG. 1)). To accommodate their use of the cloud resources, cloud resources may be multi-tenanted, meaning that any given resource may serve more than one cloud services recipient (e.g., client device 102 and 104 (FIG. 1)). To ensure that an apportionment that meets the needs of a given cloud services recipient, server 114 may dedicate a physical host to a single cloud services recipient (i.e., restrict the use of multitenanting). In another example, server 114 (FIG. 1) and server 116 (FIG. 1) may represent edge servers that are geographically close to a represent client device (e.g., client device 102 (FIG. 1 and client device 104 (FIG. 1), respectively). In such embodiments, edge server 114 and edge server 116 may be further connected to a central server in cloud service 106. Cloud service 106 may assign server 114 to client device 102 and/or server 116 to client device 104 based on the geographic location of the client devices with respect to the edge servers, based on the network conditions along a given network path, and/or other quality of service conditions on the network. If so, process 500 proceeds to step 512 and apportions the cloud resources based on the selected scheme. If process 500 determines not to apportion based on the cloud resources based on the physical host, process 500 proceed to step 506.

At step 506, process 500 (e.g., via control circuitry at server 114 (FIG. 1)) determines whether to apportion based on installing one or more applications of the first cloud services recipient on hardware of the cloud services provider. For example, cloud service 106 may use an IaaS model and install (and directly run) a given application for a cloud services recipient. In another example, to apportion cloud resources to a given cloud services recipient, cloud service 106 may switch from a SaaS model to a IaaS model to meet the needs of the cloud services recipient. If so, process 500 proceeds to step 512 and apportions the cloud resources based on the selected scheme. If process 500 determines not to apportion based on installing one or more applications of the first cloud services recipient on hardware of a cloud services provider, process 500 proceed to step 508.

At step 508, process 500 (e.g., via control circuitry at server 114 (FIG. 1)) determines whether to apportion based on setting one or more limits for input/output operations per second for one or more applications of the first cloud services recipient. For example, the cloud services provider may install and operate application software on cloud service 106 (FIG. 1) and cloud services recipients (e.g., using client devices 102 and 104 (FIG. 1)) may access the software from cloud service 106. The cloud services recipients may not manage the cloud infrastructure and platform where the application runs, and thus cloud service 106 may apportion cloud resources by setting limits on the I/O operations that can happen per second or otherwise throttle the resources provided to the cloud services recipient. If so, process 500 proceeds to step 512 and apportions the cloud resources based on the selected scheme. If process 500 determines not to apportion based on the cloud resources based on setting one or more limits for input/output operations per second for one or more applications of the first cloud services recipient, process 500 proceed to step 510.

At step 510, process 500 (e.g., via control circuitry at server 114 (FIG. 1)) determines to use a default scheme to apportion the cloud resources before proceeding to step 512. This scheme may be derived from an industry standard, a term of service, and/or a selection by a cloud services recipient.

At step 512, process 500 (e.g., via control circuitry at server 114 (FIG. 1)) apportions an amount of cloud resources to the first cloud services recipient based on the selected scheme. For example, server 114 (FIG. 1) may apportion an amount of the cloud resource to the first cloud services recipient (client device 102 (FIG. 1)) during a second time period based on the estimated amount of the cloud resource used by the first cloud services recipient during the second time period by selecting a particular physical host, installing application hardware directly on cloud resources, and/or setting I/O limits. In some embodiments, server 114 (FIG. 1) may apportion an amount of cloud resources to a second cloud services recipient for the second time period based on the amount of cloud resources apportioned to the first cloud services recipient for the second time period. In such cases, the amount of cloud resources apportioned to the second cloud services recipient for the second time period may be further based on an estimated amount received in a usage file from the second cloud services recipient.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

Although the present invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for provisioning cloud services, the method comprising: receiving a first usage file from a first cloud services recipient, wherein the first usage file from the first cloud services recipient includes an estimated amount of cloud resources to be used by the first cloud services recipient during a first time period; receiving a first output file from the first cloud services recipient, wherein the first output file from the first cloud services recipient includes an actual amount of cloud resources used by the first cloud services recipient during the first time period; determining a ratio of the estimated amount of cloud resources to be used by the first cloud services recipient during the first time period to the actual amount of cloud resources used by the first cloud services recipient during the first time period; receiving a second usage file from the first cloud services recipient, wherein the second usage file from the first cloud services recipient includes an estimated amount of cloud resources to be used by the first cloud services recipient during a second time period; determining a predicted amount of cloud resources needed by the first cloud services recipient during the second time period by applying the ratio to the estimated amount of cloud resources to be used by the first cloud services recipient during the second time period; and apportioning an amount of cloud resources to the first cloud services recipient for the second time period based on the predicted amount of cloud resources needed by the first cloud services recipient during the second time period.
2. The method of embodiment 1, further comprising: determining whether an application used by the first cloud services recipient during the first time period is of an unauthorized type; in response to determining that an application used by the first cloud services recipient during the first time period is of an unauthorized type, subtracting an amount of cloud resources used by the unauthorized application from the actual amount of cloud resources used by the first cloud services recipient during the first time period to determine an authorized actual amount of cloud resources used by the first cloud services recipient during the first time period; and determining a revised ratio based on the estimated amount of cloud resources to be used by the first cloud services recipient during the first time period and the authorized actual amount of cloud resources used by the first cloud services recipient during the first time period.
3. The method of embodiment 2, further comprising: receiving a second output file from the first cloud services recipient, wherein the second output file includes an actual amount of cloud resources used by the first cloud services recipient during the second time period, and wherein determining the revised ratio is further based on the estimated amount of cloud resources to be used by the first cloud services recipient during the second time period and the actual amount of cloud resources used by the first cloud services recipient during the second time period.
4. The method of embodiment 2, wherein determining the revised ratio is further based on the estimated amount of cloud resources to be used by the first cloud services recipient during the second time period and an authorized actual amount of cloud resources used by the first cloud services recipient during the second time period.
5. The method of any of embodiments 1-4, further comprising: receiving a second output file from the first cloud services recipient, wherein the second output file includes an actual amount of cloud resources used by the first cloud services recipient during the second time period; determining whether an application used by the first cloud services recipient during the second time period is of an unauthorized type; in response to determining that an application used by the first cloud services recipient during the second time period is of an unauthorized type, subtracting an amount of cloud resources used by the unauthorized application from the actual amount of cloud resources used by the first cloud services recipient during the second time period, to determine an authorized actual amount of cloud resources used by the first cloud services recipient during the second time period; and determining a revised ratio based on the estimated amount of cloud resources to be used by the first cloud services recipient during the second time period and the authorized actual amount of cloud resources used by the first cloud services recipient during the second time period.
6. The method of any of embodiments 1-5, wherein the first output file from the first cloud services recipient further includes first time period application information which includes information about one or more applications that used cloud resources during the first time period, the method further comprising: receiving a second output file from the first cloud services recipient, the second output file including second time period application information which includes information about one or more applications that used cloud resources during the second time period; and determining whether an application used by the first cloud services recipient is of an unauthorized type based on comparing first time period application information with second time period application information.
7. The method of any of embodiments 1-6, wherein comparing first time period application information with second time period application information includes comparing lengths of code of one or more applications that used cloud resources during the first time period with lengths of code of one or more applications that used cloud resources during the second time period.
8. The method of any of embodiments 1-7, wherein comparing first time period application information with second time period application information includes comparing a number of function calls of one or more applications that used cloud resources during the first time period with a number of function calls of one or more applications that used cloud resources during the second time period.
9. The method of any of embodiments 1-8, further comprising: receiving a first usage file from a second cloud services recipient, wherein the first usage file from the second cloud services recipient includes an estimated amount of cloud resources to be used by the second cloud services recipient during the first time period; receiving an output file from the second cloud services recipient, wherein the output file from the second cloud services recipient includes an actual amount of cloud resources used by the second cloud services recipient during the first time period; determining a second recipient ratio of the estimated amount of cloud resources to be used by the second cloud services recipient during the first time period to the actual amount of cloud resources used by the second cloud services recipient during the first time period; receiving a second usage file from the second cloud services recipient, wherein the second usage file from the second cloud services recipient includes an estimated amount of cloud resources to be used by the second cloud services recipient during the second time period; determining a predicted amount of cloud resources needed by the second cloud services recipient during the second time period by applying the second recipient ratio to the estimated amount of cloud resources to be used by the second cloud services recipient during the second time period; and apportioning an amount of cloud resources to the second cloud services recipient for the second time period based on the predicted amount of cloud resources needed by the second cloud services recipient during the second time period.
10. The method of embodiments 9, further comprising selecting a first cloud services physical host for the first cloud services recipient for the second time period and a second cloud services physical host for the second cloud services recipient for the second time period based on the amount of cloud resources apportioned to the first cloud services recipient for the second time period and on the amount of cloud resources apportioned to the second cloud services recipient for the second time period.
11. The method of any of embodiments 1-10, further comprising apportioning an amount of cloud resources to a second cloud services recipient for the second time period based on the amount of cloud resources apportioned to the first cloud services recipient for the second time period.
12. The method of embodiment 11, wherein the amount of cloud resources apportioned to the second cloud services recipient for the second time period is further based on an estimated amount received in a usage file from the second cloud services recipient.
13. The method of any of embodiments 1-12, wherein apportioning the amount of cloud resources to the first cloud services recipient during the second time period includes installing one or more applications of the first cloud services recipient on hardware of a cloud services provider.
14. The method of any of embodiments 1-13, wherein apportioning the amount of cloud resources to the first cloud services recipient during the second time period includes setting one or more limits for input/output operations per second for one or more applications of the first cloud services recipient.
15. A tangible, non-transitory, machine-readable medium storing instructions that, when executed by a data processing apparatus, cause the data processing apparatus to perform operations comprising those of any of embodiments 1-14.
16. A system comprising: one or more processors; and memory storing instructions that, when executed by the processors, cause the processors to effectuate operations comprising those of any of embodiments 1-14.

What is claimed is:

1. A method for provisioning cloud services, the method comprising:
receiving an estimated amount of cloud resources indicated by a first cloud services recipient during a past time period and an actual amount of cloud resources used by the first cloud services recipient during the past time period;
in response to determining that an application used by the first cloud services recipient during the past time period is of an unauthorized type, determining an authorized actual amount of cloud resources used by the first cloud services recipient during the past time period based on an amount of cloud resources used by the application during the past time period and the amount of cloud resources used by the first cloud services recipient during the past time period;
retrieving the estimated amount of cloud resources indicated by the first cloud services recipient during the past time period and the authorized actual amount of cloud resources used by the first cloud services recipient during the past time period; and
updating the estimated amount of cloud resources indicated by the first cloud services recipient during a future time period based on the estimated amount of cloud resources indicated by the first cloud services recipient during the past time period and the authorized actual amount of cloud resources used by the first cloud services recipient during the past time period.
2. The method of claim 1, further comprising:
receiving an estimated amount of cloud resources to be used by the first cloud services recipient during the future time period;
determining a ratio of the estimated amount of cloud resources indicated by the first cloud services recipient during the past time period to the actual amount of cloud resources used by the first cloud services recipient during the past time period; and
determining a predicted amount of cloud resources needed by the first cloud services recipient during the future time period by applying the ratio to the estimated amount of cloud resources indicated by the first cloud services recipient during the future time period.
3. The method of claim 2, wherein:
the estimated amount of cloud resources to be used by the first cloud services recipient during the past time period is received in a first usage file;

the actual amount of cloud resources used by the first cloud services recipient during the past time period is received in a first output file; and the estimated amount of cloud resources to be used by the first cloud services recipient during the future time period is received in a second usage file.

4. The method of claim 3, wherein the first output file from the first cloud services recipient further includes past time period application information which includes information about one or more applications that used cloud resources during the past time period.

5. The method of claim 4, further comprising:

receiving a second output file from the first cloud services recipient, the second output file including future time period application information which includes information about one or more applications that used cloud resources during the future time period; and determining whether an application used by the first cloud services recipient is of an unauthorized type based on comparing the past time period application information with the future time period application information.

6. The method of claim 5, wherein comparing the past time period application information with the future time period application information includes comparing lengths of code of one or more applications that used cloud resources during the past time period with lengths of code of one or more applications that used cloud resources during the future time period.

7. The method of claim 5, wherein comparing the past time period application information with the future time period application information includes comparing a number of function calls of one or more applications that used cloud resources during the past time period with a number of function calls of one or more applications that used cloud resources during the future time period.

8. The method of claim 1, further comprising:

apportioning an amount of cloud resources to the first cloud services recipient during the future time period by installing one or more applications of the first cloud services recipient on hardware of a cloud services provider.

9. The method of claim 1, further comprising:

apportioning an amount of cloud resources to the first cloud services recipient during the future time period by setting one or more limits for input/output operations per second for one or more applications of the first cloud services recipient.

10. The method of claim 1, further comprising:

selecting a first cloud services physical host for the first cloud services recipient for the future time period based on the amount of cloud resources apportioned to the first cloud services recipient for the future time period.

11. A non-transitory computer-readable medium comprising instructions that, when executed by one or more processors, cause operations comprising:

receiving an estimated amount of cloud resources indicated by a first cloud services recipient during a past time period and an actual amount of cloud resources used by the first cloud services recipient during the past time period;

in response to determining that an application used by the first cloud services recipient during the past time period is of an unauthorized type, determining an authorized actual amount of cloud resources used by the first cloud services recipient during the past time period based on an amount of cloud resources used by the application during the past time period and the amount of cloud resources used by the first cloud services recipient during the past time period;

retrieving the estimated amount of cloud resources indicated by the first cloud services recipient during the past time period and the authorized actual amount of cloud resources used by the first cloud services recipient during the past time period; and updating the estimated amount of cloud resources indicated by the first cloud services recipient during a future time period based on the estimated amount of cloud resources indicated by the first cloud services recipient during the past time period and the authorized actual amount of cloud resources used by the first cloud services recipient during the past time period.

12. The non-transitory computer-readable medium of claim 11, further comprising:

receiving an estimated amount of cloud resources to be used by the first cloud services recipient during the future time period;

determining a ratio of the estimated amount of cloud resources indicated by the first cloud services recipient during the past time period to the actual amount of cloud resources used by the first cloud services recipient during the past time period; and determining a predicted amount of cloud resources needed by the first cloud services recipient during the future time period by applying the ratio to the estimated amount of cloud resources indicated by the first cloud services recipient during the future time period.

13. The non-transitory computer-readable medium of claim 12, wherein:

the estimated amount of cloud resources to be used by the first cloud services recipient during the past time period is received in a first usage file;

the actual amount of cloud resources used by the first cloud services recipient during the past time period is received in a first output file; and the estimated amount of cloud resources to be used by the first cloud services recipient during the future time period is received in a second usage file.

14. The non-transitory computer-readable medium of claim 13, wherein the first output file from the first cloud services recipient further includes past time period application information which includes information about one or more applications that used cloud resources during the past time period, further comprising:

receiving a second output file from the first cloud services recipient, the second output file including future time period application information which includes information about one or more applications that used cloud resources during the future time period; and determining whether an application used by the first cloud services recipient is of an unauthorized type based on comparing the past time period application information with the future time period application information.

15. The non-transitory computer-readable medium of claim 14, wherein comparing the past time period application information with the future time period application information includes comparing lengths of code of one or more applications that used cloud resources during the past time period with lengths of code of one or more applications that used cloud resources during the future time period.

16. The non-transitory computer-readable medium of claim 14, wherein comparing the past time period application information with the future time period application information includes comparing a number of function calls of one or more applications that used cloud resources during the past time period with a number of function calls of one or more applications that used cloud resources during the future time period.

17. The non-transitory computer-readable medium of claim 11, further comprising:
apportioning an amount of cloud resources to the first cloud services recipient during the future time period by installing one or more applications of the first cloud services recipient on hardware of a cloud services provider.

18. The non-transitory computer-readable medium of claim 11, further comprising:
apportioning an amount of cloud resources to the first cloud services recipient during the future time period by setting one or more limits for input/output operations per second for one or more applications of the first cloud services recipient.

19. The non-transitory computer-readable medium of claim 11, further comprising:
selecting a first cloud services physical host for the first cloud services recipient for the future time period based on the amount of cloud resources apportioned to the first cloud services recipient for the future time period.

20. A system for provisioning cloud services, comprising:
at least one processing device; and
at least one storage medium comprising instructions that when executed cause the at least one processing device to perform a method comprising:
receiving an estimated amount of cloud resources indicated by a first cloud services recipient during a past time period and an actual amount of cloud resources used by the first cloud services recipient during the past time period;
in response to determining that an application used by the first cloud services recipient during the past time period is of an unauthorized type, determining an authorized actual amount of cloud resources used by the first cloud services recipient during the past time period based on an amount of cloud resources used by the application during the past time period and the amount of cloud resources used by the first cloud services recipient during the past time period;
retrieving the estimated amount of cloud resources indicated by the first cloud services recipient during the past time period and the authorized actual amount of cloud resources used by the first cloud services recipient during the past time period;
and
updating the estimated amount of cloud resources indicated by the first cloud services recipient during a future time period based on the estimated amount of cloud resources indicated by the first cloud services recipient during the past time period and the authorized actual amount of cloud resources used by the first cloud services recipient during the past time period.

* * * * *